US008633671B2

(12) United States Patent
Kelly et al.

(10) Patent No.: US 8,633,671 B2
(45) Date of Patent: Jan. 21, 2014

(54) PHOTO-VOLTAIC CHARGING OF HIGH VOLTAGE TRACTION BATTERIES

(75) Inventors: Nelson A. Kelly, Sterling Heights, MI (US); David B. Ouwerkerk, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 365 days.

(21) Appl. No.: 13/076,483

(22) Filed: Mar. 31, 2011

(65) Prior Publication Data

US 2012/0249047 A1  Oct. 4, 2012

(51) Int. Cl.
*H01M 10/46* (2006.01)
*H01L 31/042* (2006.01)

(52) U.S. Cl.
USPC .......................................... 320/101; 136/244

(58) Field of Classification Search
USPC .......................................... 320/101; 136/244
See application file for complete search history.

(56) References Cited

U.S. PATENT DOCUMENTS

| 4,724,010 | A  * | 2/1988  | Okaniwa et al. | 136/246 |
| 6,255,804 | B1 * | 7/2001  | Herniter et al. | 320/137 |
| 6,475,661 | B1 * | 11/2002 | Pellegri et al. | 429/105 |
| 7,906,007 | B2 * | 3/2011  | Gibson et al. | 205/637 |
| 8,089,242 | B2 * | 1/2012  | Loudot | 320/101 |
| 2006/0065302 | A1 * | 3/2006 | Gibson et al. | 136/291 |
| 2008/0111517 | A1 * | 5/2008 | Pfeifer et al. | 320/101 |
| 2009/0266397 | A1 | 10/2009 | Gibson et al. | |
| 2010/0230292 | A1 | 9/2010  | Kelly et al. | |
| 2010/0231162 | A1 | 9/2010  | Gibson et al. | |
| 2010/0277115 | A1 * | 11/2010 | Lai | 320/101 |
| 2011/0031926 | A1 * | 2/2011 | Bhat et al. | 320/101 |
| 2011/0126882 | A1 * | 6/2011 | Kwak | 136/246 |
| 2011/0163710 | A1 * | 7/2011 | Syed et al. | 320/101 |
| 2012/0173031 | A1 * | 7/2012 | Parameswaran et al. | 700/295 |
| 2012/0268087 | A1 * | 10/2012 | Kernahan | 323/234 |

OTHER PUBLICATIONS

Thomas L. Gibson et al.; Solar photovoltaic charging of lithium-ion batteries; Journal of Power Sources 195 (2010) 3928-3932.

* cited by examiner

*Primary Examiner* — M'Baye Diao
(74) *Attorney, Agent, or Firm* — Reising Ethington P.C.

(57) ABSTRACT

Photovoltaic (PV) systems for charging high voltage batteries used to power the electric traction motor of an electrically-powered vehicle are described. Suitable PV systems, fabricated of interconnected solar cells, modules or arrays, may be designed and adapted to efficiently charge a high voltage battery by matching the characteristics of the PV system to the fully-charged voltage of the battery. Preferably, a charging efficiency of about 90% or greater may be achieved through proper matching of the PV system to the battery. A reconfigurable PV system, based on assemblies of solar modules, is described. The reconfigurable PV system is capable of properly matching itself to a variety of different batteries, each of which may have a different voltage when fully charged. By using several reconfigurable PV systems a variety of batteries with different charged voltages may be charged simultaneously while utilizing substantially the full capacity of the PV system to charge batteries.

15 Claims, 7 Drawing Sheets

PHOTO-VOLTAIC CHARGING OF HIGH VOLTAGE TRACTION BATTERIES

TECHNICAL FIELD

This disclosure pertains to the charging of high voltage traction batteries, such as are used to power hybrid and electric vehicles, using photo-voltaic (PV) cells, modules, and arrays.

BACKGROUND OF THE INVENTION

There is increasing interest in vehicles which may be powered by electric motors using stored electrical energy from a battery. Commonly, these electric motors are termed traction motors and the battery which powers them is referred to as a traction battery. Such vehicles may be all-electric and include no conventional internal combustion (IC) engine, or hybrids, in which an IC engine and an electric motor cooperate in powering the vehicle. Typically the traction batteries used in such vehicles employ either a nickel metal hydride (NiMH) or Lithium-ion (Li-ion) chemistry, although new chemistries are under investigation. Regardless of the electrochemistry of the battery, traction batteries generally consist of large numbers of individual electrochemical cells connected together in series and parallel to deliver electricity at voltages at least in excess of 200 volts with a range of energy storage capacities. High voltages are preferred so that large amounts of power can be delivered to the electric drive motor at lower currents.

One reason for the interest in these vehicles is their potential for reducing vehicle tail-pipe pollutant emissions and increasing the vehicle energy efficiency. Since their batteries may be charged using electrical power generated by utilities, any distance traveled under electric operation will reduce IC engine operation and the associated IC engine tail-pipe emissions. Also, electric motors may be easily reversed to generate electricity to recharge the battery, a procedure referred to as regenerative braking, so that the vehicle efficiency is increased.

An alternative approach is to recharge the battery using electricity from renewable resources. One possible source of such renewable electrical energy is solar energy harvested by photovoltaic (PV) solar cells, modules, and arrays. Generally speaking, a solar PV cell is the simplest configuration for converting solar energy into electricity. It is a semiconductor with a p-n junction. Often solar cells are silicon-based, single crystal, polycrystalline or amorphous but other compound semiconductor materials such as CdTe and $CuInSe_2$ may be used. For greater efficiency cells may be constructed in multiple layers, each layer being of a composition adapted to efficiently capture the energy in a specific portion of the solar spectrum, referred to as "spectrum-splitting". A PV cell will output electricity at a voltage depending only on the characteristics of the semiconductor p-n junction. The current available from a single cell depends on the solar energy incident on the cell, commonly called the irradiance, and the cell area.

While the current available from individual cells may be adjusted by varying the cell area the voltage is always the same and established by the nature of the semiconductor. So, for increased utility, a plurality of cells is usually wired together to form modules. Yet further tuning of the capabilities of a solar power generation system may result from wiring a plurality of modules together to form an array. These multi-cell configurations enable a wide range of voltage and current combinations depending on how the cell-to-cell and module-to-module electrical connections are made. Generally, for both cells and modules, series connections will increase the voltage and parallel connections will result in higher current output. A photovoltaic (PV) system for charging traction batteries may consist of an array or multiple arrays.

A PV system will generate significant power only during daylight so use of a PV system to recharge traction batteries is only feasible during daylight hours. On working days, the daylight hours will align with working hours for many drivers and many vehicles will be parked at a workplace during much of the day. It is therefore feasible to contemplate parking garages or the like incorporating charging stations powered by a large PV system capable of fully charging a traction battery in less than 8 hours.

The overall efficiency of a solar PV system when charging a battery is the product of the solar cell efficiency, that is, the sunlight-to-electricity efficiency of the PV system, and the coupling efficiency of the PV and battery systems. The coupling efficiency will dictate how efficiently the electricity generated by the PV system is accepted by the battery. Although high performance solar cells with sunlight-to-electricity efficiencies of more than 40% have been reported, the efficiency of commercially available cells used in manufacturing PV modules is generally lower, typically about 20% or so. This lower solar energy-to-electricity efficiency and the desire of customers to minimize the size of the solar-energy system and recharge their batteries in the shortest possible time, mandates a high coupling efficiency between PV and battery systems to achieve the highest possible solar energy-to-battery charging efficiency.

There is therefore a need to design and manage the characteristics of the PV system, informed by the characteristics of the battery, to achieve a high coupling efficiency between the PV and battery systems.

SUMMARY OF THE INVENTION

Electrically-powered vehicles, hybrid or pure electric, employ electric motors as traction devices and rechargeable batteries, more commonly termed traction batteries, as energy storage devices. Typically such traction batteries provide electricity at high voltages, at least in excess of 200 volts and, more typically, of over 300 volts. Such traction batteries vary in their energy storage capabilities but all are capable of powering the vehicle for some appreciable predetermined range when fully charged.

When the energy stored in the battery is exhausted, it may be replenished by charging the battery with conditioned power from any suitable power source. Presently, these power sources include AC power generated at stationary power plants and distributed by a utility, and on-vehicle generated power by means of an auxiliary motor connected to an alternator. Of course appropriate conversion of alternating current (AC) power to the direct current (DC) power required by the battery is required. The efficiency of such conversion is typically about 95%.

Solar power, captured by PV systems of suitably-arranged and connected solar cells, modules, and arrays, offers yet another opportunity for charging such traction batteries, and has the benefit that AC to DC conversion is not required. But solar cells are not particularly efficient in converting sunlight to electricity. An efficiency of about 20%, is typical for commercially-available systems, and further, the efficiency with which the available solar-generated electricity may be accepted a battery can vary dramatically. The coupling efficiency between a PV system and a battery can range from a low value of essentially zero to a maximum value of nearly 100% depending upon how well the voltage of a PV system are matched to the voltage of the battery. So a PV system battery charger, particularly a charger intended to convey the large charge stored in a traction battery, must be designed to efficiently couple to the battery if that battery charging time should not exceed a customer-acceptable period.

Although there is a range of photovoltaic materials and configurations under consideration, each with their characteristic electrical properties, single junction, crystalline or polycrystalline silicon-based solar cells are most commonly used to build systems. By way of example only, such single junction silicon solar cells may develop approximately 0.5-0.6 volts under open circuit conditions irrespective of the cell area. A single solar cell with an area of 1 meter$^2$, would develop a current of 330 to 350 amperes (A) under a solar irradiance of 1000 watts/meter$^2$, approximating full sunlight. However, such low voltage high current systems are impractical, and rather strings of solar cells are connected in series, increasing the voltage to the sum of the number of cells in series, to build commercial PV modules, often with module areas of about 1 meter$^2$. Modules can be further connected in series, to increase the PV system voltage, or in parallel, to increase the PV system current or in some combination of series and parallel to form a PV system with a desired voltage-current characteristic.

Solar cells, and the larger PV systems fabricated form them, approximate constant current power sources over a relatively wide range of load voltages. That is, from zero volts up to a specified voltage, the current supplied by a PV system to a load is substantially constant until an upper limiting voltage, called the open-circuit voltage, Voc, is reached. As Voc is approached, the current rapidly decreases to zero. This characteristic renders the quantity of power which may extracted from a PV system highly voltage dependent. At low voltages and at high voltages the available power is low. At some intermediate voltage, known as the maximum power point voltage, Vmmp, the available power is a maximum and equal to the product of the current at the maximum power point (the maximum power point current, Impp) and Vmmp. For efficient transfer of power from a PV system to a load, the PV system should operate at its maximum power point voltage.

However the operating voltage of a PV system may not be selected or 'dialed-in' independently but rather is set by the electrical load which the PV system is powering. So, when a PV system is connected to a battery the PV system will operate at the battery voltage which, in most circumstances, will not correspond to the maximum power point voltage of the PV system.

Further, a battery does not generate a single, fixed voltage, but rather a voltage which depends on its state of charge. The battery's operating voltage window, extending from fully charged to fully discharged state, then defines a voltage range, rather than a particular voltage such as the maximum power point voltage of the solar array. So, although the terminal recharging voltage will never exceed the voltage corresponding to the fully charged state, the initial charging voltage may be anywhere in the battery operating range. So any charging system, including a PV charging system, must be capable of functioning effectively in this voltage range. As will be detailed later, these battery characteristics require that the operating voltage range of the battery should encompass a range overlapping the maximum power point voltage of the PV system.

To maintain battery performance, the operating range of the battery may be managed. Many rechargeable batteries, if charged or discharged excessively, undergo irreversible internal chemical reactions which compromise their future ability to accept and store energy and shorten their useful life. This is avoided by imposing a predetermined allowable operating voltage range on these traction batteries. This allowable operating range is imposed by appropriate sensing and control capabilities either built into the battery or incorporated into the battery control circuitry in the vehicle in which the battery is installed. These sensors and controllers have capabilities for protecting the battery from exposure to any operating mode with potential to limit battery life. This capability includes limiting the charging rate and disconnecting the battery from a charger if further charging would exceed the maximum rated battery voltage.

The PV system may exploit this capability. An efficient PV system will be capable of overcharging the battery but the PV system will not incorporate any algorithm for capability for terminating the charging process if overcharging is imminent. Rather the sensors and controls built into the battery and/or vehicle will be used. However, the PV system may include sensing and capability for determining the battery voltage and the ability to adjust the number of solar modules or arrays connected in series to reach a voltage sufficient to bring the battery to its fully charged state. In addition, the PV system may be able to adjust the number of PV modules or arrays in parallel to charge the battery at an appropriate rate, so as not to charge the battery too fast, and compromise battery health. A low charging rate, which may occur during inclement weather, conditions, will not compromise battery health but may result in excessive charging times.

The maximum power point voltage of the PV system depends on the amount of light incident on the PV system, called the solar irradiance, and also on the temperature of the PV system. Thus, since the solar cells, modules, or arrays comprising the PV system may be called upon to charge a battery under a wide range of meteorological conditions and battery states-of-charge, the PV system must be designed to operate over an extended voltage range with acceptably high efficiency.

To charge a battery, the output voltage of the PV system must exceed the terminal voltage of the battery. When such a PV system is connected to a battery load, the battery will pull the operating voltage of the PV system down so that it equals the terminal voltage of the battery. It is not feasible to restrict the allowable output voltage of a traction battery to only a single voltage or to a narrow voltage range. Hence in a battery with a range of acceptable operating voltages, it will not be feasible to operate any PV system at 100% efficiency over the entire charging cycle. However in the vicinity of the maximum power point voltage, the variation in the PV system efficiency can be small, keeping transfer of energy between the PV and battery systems at greater than 90%, over an appreciable voltage range. A typical normalized voltage range for 90% efficient energy transfer is from 0.84-1.11 times the maximum power point voltage.

This normalized PV system voltage range corresponds well to an acceptable voltage range for battery charging. For example a representative Nickel-Metal Hydride (NiMH) battery may have a voltage of 340 volts when fully charged and be managed to have a voltage of 240 volts when fully discharged. However, once disconnected from a load in a discharged state, the battery voltage will recover to about 290 volts due to surface charge effects. A PV system can provide 90% or more of its maximum deliverable power over a voltage range extending from a voltage, V90(L), lower than the PV system's maximum power point voltage, to a second voltage V90(H) which is higher than the PV system's maximum power point voltage.

To achieve at least a 90% coupling efficiency between the PV and battery systems, the voltage of the battery, when fully charged, should be substantially equal to, but lower than the V90(H) voltage of the PV system.

In an embodiment a PV system, dedicated to charging, with a PV charge efficiency of at least 90% for a particular traction battery, is disclosed. Such a PV array will consist of suitable numbers of solar cells or solar modules, connected in series and/or parallel to suitably match the battery electrical characteristics and provide sufficient current to enable full charge at an acceptable charging rate in an acceptable time period.

In another embodiment a PV system suited for high efficiency charging of one of a number of different traction batteries is disclosed. Such a PV array will consist of a number of switchable solar cells or solar modules. After sensing the specified charged battery voltage, an appropriate number of such cells or modules may be switched and connected in series and/or parallel, thereby assembling the modules into the PV system. The PV system may be assembled to suitably match any of a number of battery electrical characteristics and provide sufficient current to enable full charge in an acceptable time period at an acceptable charging rate.

In a further embodiment a PV system, adapted and constructed to simultaneously charge a variety of traction batteries of varying voltages, is disclosed. Such a PV array will consist of a number of switchable solar cells or solar modules. With knowledge of each of the specified charged battery voltages, an appropriate number of such cells or modules may be switched and connected in series and/or parallel to assemble a suitable number of PV arrays. Each of the assembled PV arrays will suitably match any of a number of battery electrical characteristics for a specific battery and provide sufficient current to enable full charge in an acceptable time period at an acceptable charging rate.

In all embodiments, the battery electrical characteristics are well-characterized and known, and every battery, or the vehicle in which it is installed, has provision for limiting the charging rate or the maximum charged voltage or otherwise protecting the battery from damage due to improper charging practices.

These and other attributes of a solar PV charging system intended for efficient PV-powered charging of traction batteries to their maximum operating voltage will become more evident from consideration of the following figures and detailed descriptions.

BRIEF DESCRIPTION OF THE DRAWINGS

(FIGS. 6D-F).

DESCRIPTION OF PREFERRED EMBODIMENTS

The following description of the embodiment(s) is merely exemplary in nature and is not intended to limit the invention, its application, or uses.

In hybrid and electric vehicles, which employ electric motor propulsion systems, at least a portion of the energy needed to propel the vehicle is stored in rechargeable, high capacity, high voltage traction batteries. When such batteries are discharged they must be recharged. Current practice is to use either an on-board internal combustion (IC) engine operating an alternator or to use alternating current (AC) power, obtained from a local utility or a combination of these approaches. Of course in both these approaches the AC power must be converted to direct current (DC) power to be compatible with the DC character of the battery.

An alternative approach is to use solar power obtained from solar photovoltaic systems to charge the traction battery. Since many vehicles see only limited use during the business day when sunlight is abundant, a photovoltaic or PV system might be employed to provide solar power to vehicles parked at solar charging stations located, for example, at the vehicle owner's place of employment.

But the capabilities of the PV system must be tailored to the characteristics of the traction battery. No matter the capability of the PV system, the output voltage of the PV system will be limited to the voltage of the battery under charge. So a PV array capable of generating 400 volts, for example, will, if connected to a 250 volt battery, put out only 250 volts. But the power output of PV systems is sensitive to the voltage at which they operate and a 400 volt PV array operated at only 250 volts will not provide the battery with all the power the array is capable of delivering. Further, the voltage developed by any rechargeable battery, including a traction battery, may vary, depending on its state of charge so that the charging efficiency of the PV array may vary with the state of charge of the battery. So, it is important, for acceptable charging performance, that the PV system and battery characteristics be well-matched with respect to the voltage characteristics of the two systems.

Figure 1:
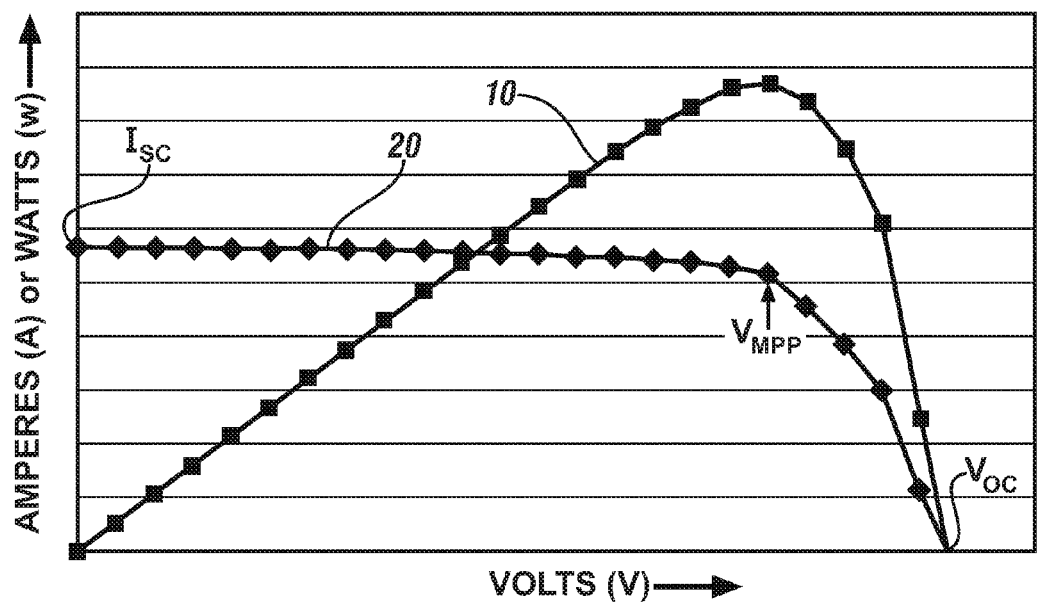
FIG. 1 is a representative graph of the current (amperes) and power (watts) obtainable from a solar cell as a function of cell voltage (volts).

The general behavior of solar cells, modules, and arrays under solar irradiation is shown in FIG. 1. Curve 20 shows the variation of the solar cell, module, or array current with cell, module or array voltage. The behavior is well described by a substantially constant, short circuit current (Isc) which is available at all cell, module, or array voltages up to the maximum power point voltage, Vmpp, a voltage at which point the available current decreases rapidly, declining to substantially zero at the cell, module, or array open circuit voltage, Voc. This current-voltage behavior leads to the variation of cell, module or array power output with voltage shown as curve 10. The power output, initially zero at zero volts, increases linearly with voltage up to about the voltage, where it reaches a maximum at the maximum power point voltage before rapidly decreasing to zero at the open circuit voltage. So, to achieve high power output from the cell, module, or array, it should be operated near the maximum power point voltage. It may be noted that the power curve, because of the rapid decrease in cell current at voltages greater than the critical voltage, is not symmetrical about the maximum power point voltage. Hence, operating a PV system at less than its maximum power point voltage results in a lesser power loss, relative to the maximum power available, than operating the PV system at a voltage greater than its maximum power point voltage.

Figure 2:
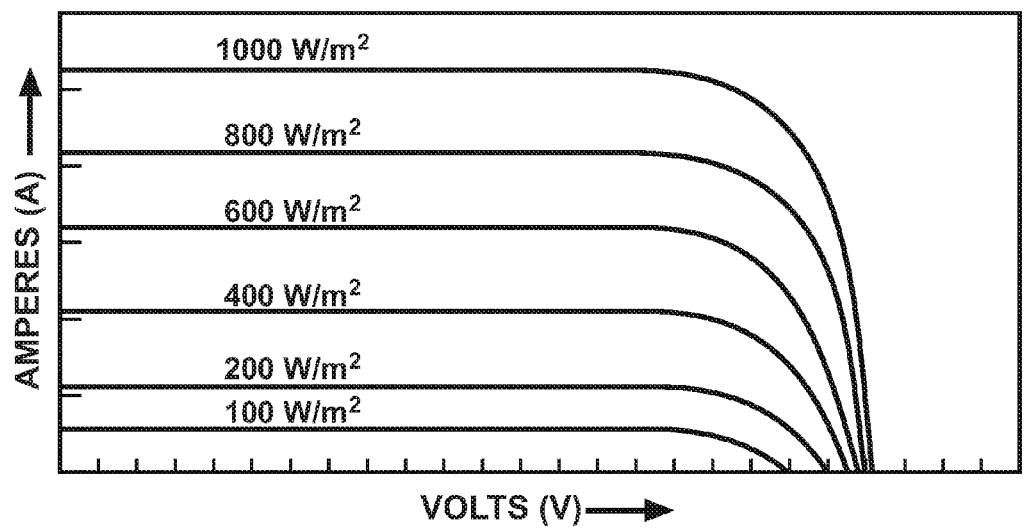
FIG. 2 is a representative graph of the effect of irradiance in watts per meter$^2$ (W/m$^2$) on the current-voltage characteristic for a typical PV solar cell or module.

FIG. 2 illustrates the influence of varying irradiance or the intensity of the sunlight incident on the cell from 100 W/m$^2$ to 1000 W/m$^2$ on a cell's or a PV system's electrical characteristics. Not unexpectedly the current generated by the cell, decreases as the incident solar power decreases, but, in addition, the open circuit voltage is also affected, decreasing as the irradiance decreases. This behavior will also drive the maximum power point voltage to lesser values with decreasing irradiance.

Figure 3:
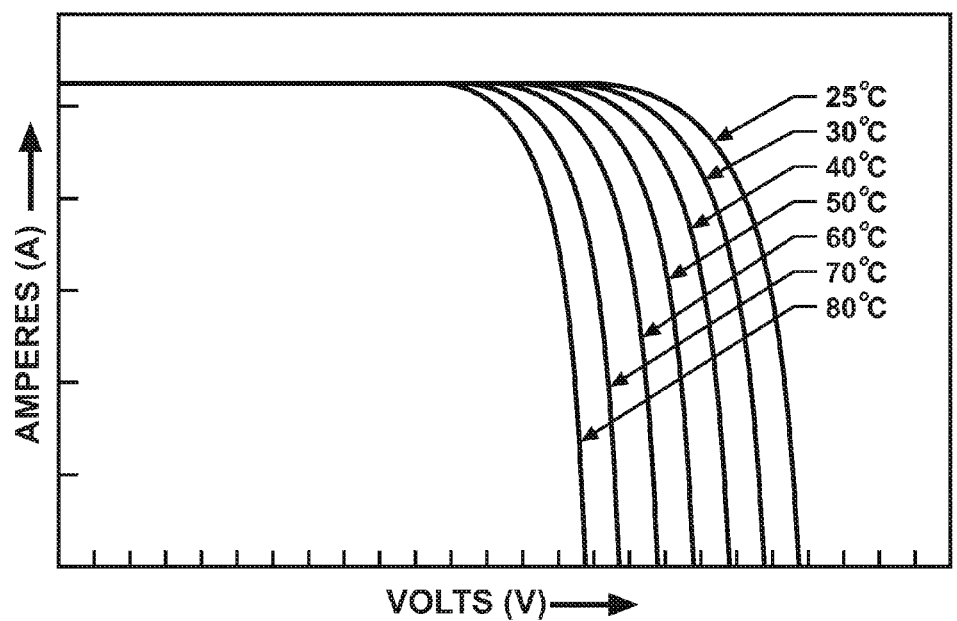
FIG. 3 is a representative graph of the effect of solar cell or module temperature on the current-voltage characteristic for a typical solar cell or module.

FIG. 3 shows the influence of cell or PV system temperature under constant irradiance. Here the primary influence is on the open circuit voltage, Voc, which decreases significantly as the cell temperature increases from 25° C. to 80° C. Fortunately the effects of irradiance and cell or PV system temperature, will partially cancel since high solar irradiance, for example on a cloudless day, will increase the available current from the cell, module, or array while also increasing the cell temperature, and so reducing the voltage. However the cell, module, or array temperature effect is typically much more influential on the cell or array voltage than the irradiance effect and solar cell, module, or array voltages are commonly de-rated if operated at temperatures than 25° C.

The low voltage available from a single solar cell is inadequate to charge a high voltage, around 300 volt, traction battery. But an assemblage of individual solar cells may be connected together in a solar module, and modules may be connected together to form arrays to develop any preferred short circuit current and open circuit voltage behavior in the array. By connecting cells in series the open circuit voltage of the module or array will be the sum of the individual cell voltages and so an array capable of satisfying the battery charge voltage may be developed. Cells connected in parallel will form a module or array whose short circuit current is the sum of short circuit currents of the individual cells or modules, enabling control of the battery charging rate.

A single junction, crystalline silicon solar cell, generally rectangular in plan view, with an area of about $11.6 \times 10^3$ mm$^2$, that is, about 76.2 mm (3 inches) by 152.4 mm (6 inches) under a solar irradiance of 1000 watts/m$^2$ is capable of providing about 1.5 watts of power at a Vmpp of about 0.5 volts and a current of about 3 amperes. Generally, fewer than 100 solar cells are connected in series in a solar module. For example a particular commercial module designated as the Sanyo HIP-190BA3 module has 96 cells in series. Higher voltage modules may be fabricated. For example, modules consisting of an assemblage of 600 such cells electrically connected in series will generate about 900 watts at about 300 volts again at a current of about 3 amperes. Electrically connecting several such 600-cell modules in parallel to form a array will enable a greater maximum current. For the above example, arrays fabricated of 2, 3 and 4 such 600-cell modules in parallel will have capabilities of 1800 watts, 2700 watts and 3600 watts and 6, 9 and 12 amperes respectively.

The utility of such a configuration may be assessed by reference to U.S. Solar Radiation Resource Maps (which may be accessed online at http://rredc.nrel.gov/solar/old_data/nsrdb/redbook/atlas/). For example, suppose it is desired to charge a vehicle over about an 8-hour period, generally corresponding to a normal working day, in Southeastern Michigan, in December, the month with the lowest time-integrated solar irradiance. The average time-integrated solar irradiance per day incident on a flat plate collector pointing south and inclined at the inclination of the latitude of Southeastern Michigan in December is approximately 2.1 kWh/m$^2$/day (kilowatt-hours per square meter per day) or, over an 8-hour daylight period about 260 watts/m$^2$/hour. Under such irradiance the just-described 600-cell solar module is capable of imparting about 1.9 kWh of energy to a high-voltage battery. For some high-voltage batteries this quantity of solar energy will be adequate to fully charge the battery but it will be appreciated that the hypothetical 600-cell module just described is exemplary and not limiting. The cell area, or the cell interconnections within a module or the number of modules connected in parallel or some combination of these approaches may be modified and adapted to achieve the desired current and voltage from the solar array consistent with climatic conditions. Thus PV systems incorporating a variety of solar cell and solar module configurations may be suited to charge the battery in a predetermined time.

Traction batteries commonly employ chemistries which offer higher power to weight and higher power to volume than the lead acid batteries commonly used in exclusively IC-engine-powered vehicles. Preferred traction battery chemistries are Nickel-Metal Hydride (NiMH) and Lithium-ion (Li-ion) although Nickel-Cadmium (NiCad) may also find limited application. All three of these battery chemistries may be operated over a voltage range corresponding to about 1 to 1.4 times their discharged voltage. By way of example only, an NiMH battery incorporating 240 cells disposed in a number of modules may exhibit an operating voltage range of 240-340 volts, an energy capacity of 1.8 kWh, and a charge capacity of 6.5 ampere hours (Ah).

The operating voltage range of such a battery is tightly controlled to prevent damage due to excessive charge or discharge. Sensors, located at least in the battery pack and, more commonly, in the individual modules of the battery pack, monitor important indicators of battery and module capability such as voltage, temperature, and state of charge. Control logic, located in the battery or in the vehicle, constantly evaluates the condition of the battery and current flows on charging or discharging the battery. Control circuitry may take appropriate action, such as limiting current draw, or controlling the rate of charge or even electrically-isolating the battery if necessary to minimize any deterioration in battery performance due to inappropriate battery use. Hence there is no necessity to incorporate any intelligence or monitoring capability for battery over-limiting charge control into the solar array charger. As will be discussed shortly, the characteristics of the solar PV charging system should be matched to the battery performance capability, but it is intended that the on-vehicle or on-battery sensors and controls which are already present, may be relied upon to prevent overcharging.

Figure 4:
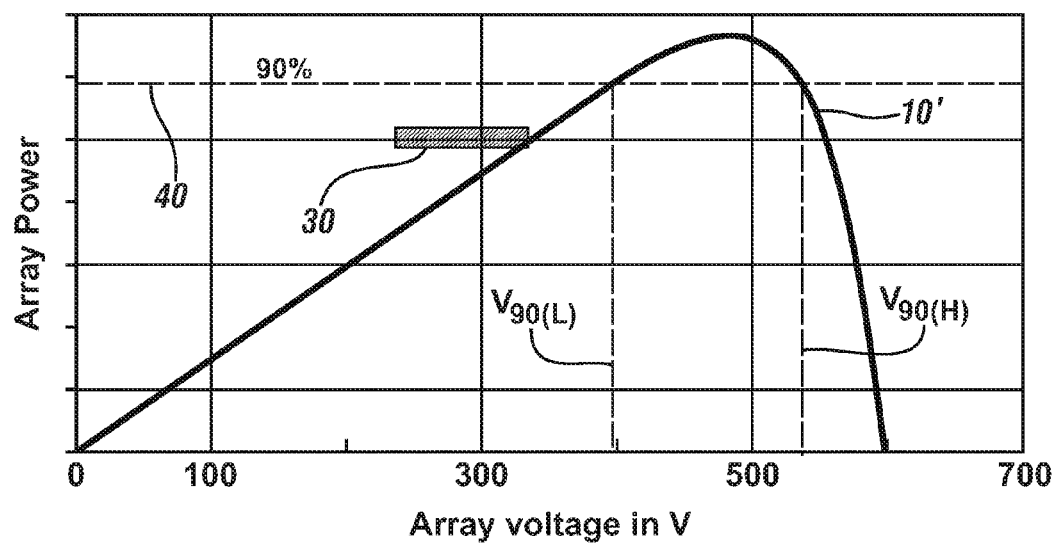
FIG. 4 is a representative graph of the power available as a function of voltage from a PV system with an open circuit voltage of about 600 volts. The operating voltage range corresponding to a particular traction battery (240 to 340 volts) is superimposed on the graph and illustrates that the charging efficiency of such a battery with this array would be less than the 90% efficiency line shown on the Figure.

To effectively charge such a battery a PV system must at least have an open-circuit voltage equal to the fully-charged battery voltage. However, as FIG. 1 makes clear, any PV system with this capability would never fully charge the battery since the power available from the cell at Voc is zero. A more rigorous requirement which ensures that the solar array may fully charge the battery to its maximum capacity and voltage, is to have the open circuit voltage of the array exceed the maximum battery charging voltage. However this requirement may not ensure that the battery is charged efficiently. Consider FIG. 4 which illustrates the power curve 10' of a PV system with an open circuit voltage, Voc, of 600 volts on which is overlaid a bar 30 representing a battery operating voltage range of 240 to 340 volts. Also shown on FIG. 4 is horizontal line 40 representing 90% of the maximum power delivered by the PV system at the maximum power point voltage.

Figure 5:
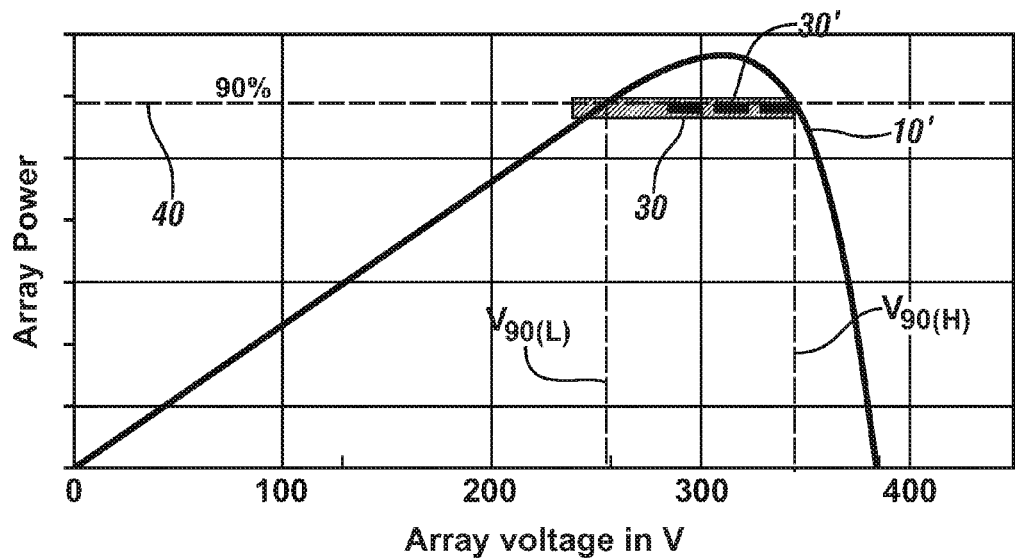
FIG. 5 is a representative graph of the power available as a function of voltage from a PV system with an open circuit voltage of about 380 volts. The operating voltage range corresponding to a particular traction battery (240 to 340 volt operating range) is superimposed on the graph and illustrates that the charging efficiency of such a battery connected with this PV system would be 90% or more.

It may be noted that with this PV array and battery system combination the efficiency of the charging operation is less than 90% so that less than the full capability of the PV system is being used to charge the battery. Contrast this with the efficiency achieved in charging the same battery with a lower, approximately 380 volt, Voc PV system as indicated in FIG. 5. The V90(H) voltage of the PV array is designed to approximate the charged voltage of the battery. The voltage range of the battery, shown as bar 30 and extending from 240 volts to 340 volts, exceeds the V90(L) to V90(H) voltage range of the PV system. But by locating the charged battery voltage at the V90(H) voltage the efficiency reduction occurs during low battery voltage charging. In this voltage range the power versus voltage slope of the PV system is less than on the high voltage range resulting a lesser overall efficiency reduction. It is intended that any PV system designed according to the practices of this invention will exhibit a V90(H) voltage which is substantially equal to the charged voltage of the battery it is designed to charge.

Figure 6:
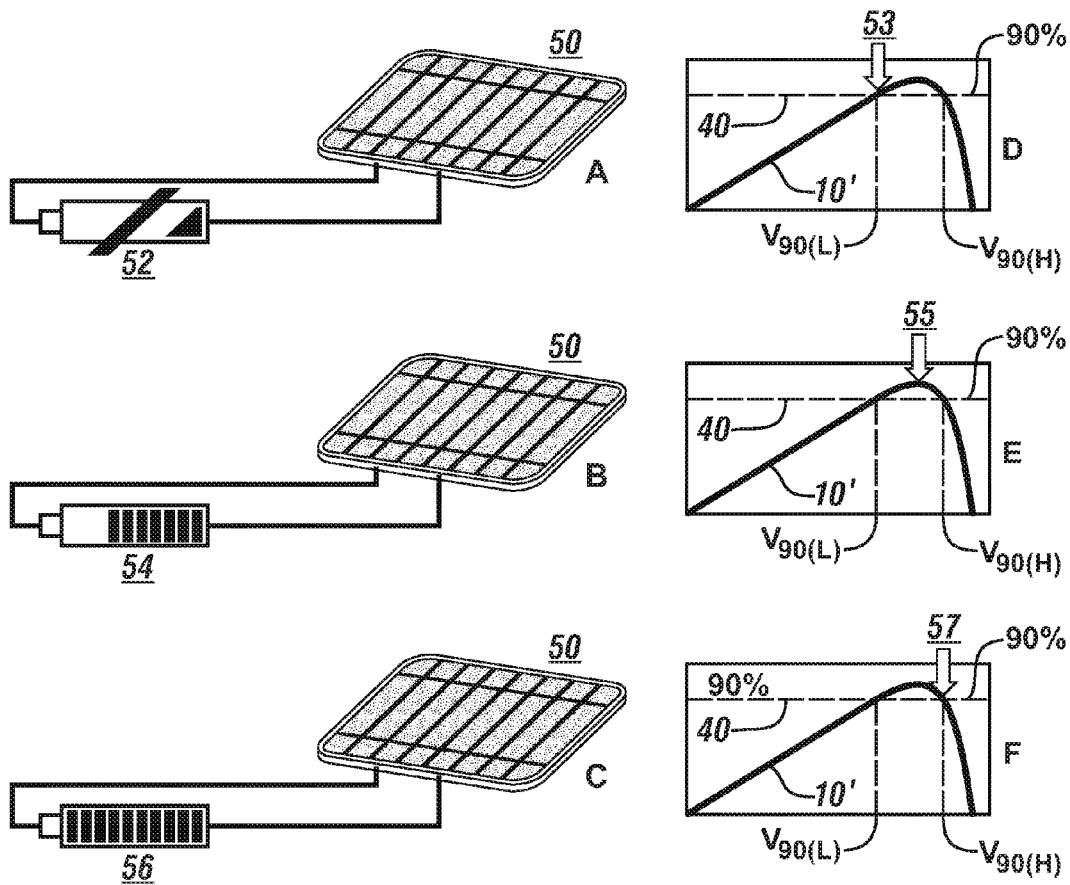
FIGS. 6A-F are schematic depictions of battery state-of-charge during charging by a PV system (FIGS. 6A-C) and the associated voltages and charging efficiencies represented on PV system power-voltage curves such as those shown in FIGS. 1, 4 and 5.

The benefits of this approach may be further appreciated by consideration of a battery with a charged voltage of 340 volts but a discharged voltage of about 290 volts represented in FIG. 5 by dashed bar 30'. This range is representative of the 240-340 volt battery shown as bar 30 in FIG. 5 after minimal recharging or even with standing after disconnection from the load. Such behavior is typical of most batteries and results from surface charge effects. The narrower charging range of 290 to 340 volts, shown as dashed bar 30' on FIG. 5, would enables the 380 volt Voc PV system to operate at even higher efficiency than the desired 90% efficiency. This practice is schematically illustrated in FIG. 6A which shows a PV system 50 charging a battery, here represented by a battery indicator state of charge display 52, when the battery is fully discharged. FIG. 6D shows a simplified version of FIG. 5 and illustrates, through arrow 53 the charge voltage and the charging power relative to the 90% charging efficiency line 40. For a battery in a fully discharged state, the charging voltage, which is equal to the battery voltage, is preferably close to or greater than V90(L) of the PV system so that high charging efficiency is obtained even on first charging the battery. This characteristic is however not controllable through modification of the PV system. In FIGS. 6B and 6E, after the battery has been charged to about 70% of its full charge 54, the charging voltage, indicated by arrow 55 in FIG. 6E approximates the maximum power point voltage and the battery is being charged at the maximum capability of the PV system.

In FIGS. 6C and 6F, when the battery is fully charged 56, the charging voltage, indicated by arrow 57 in FIG. 6F, should be substantially equal to the V90(H) voltage of the PV system, by design of the PV system. Thus by appropriately designing the PV system, it may deliver power to the battery at high efficiency over the entire battery voltage range, that is, no matter its initial state of charge or SOC. In the example shown, an efficiency of at least 90% or greater could be achieved over the complete charging cycle. For batteries exhibiting other battery voltage ranges or other PV systems, greater or lesser charging efficiencies might be obtained. Such behaviors are consistent with the scope and spirit of the invention provided that the V90(H) voltage of the PV system is substantially equal to the charged battery voltage.

It is apparent in FIG. 6F that when the battery achieves its maximum desired voltage of 340 volts that the PV system is yet capable of continuing to charge the battery since it can continue to deliver power to the battery at an increasing voltage, and lessened efficiency, until it attains its open circuit voltage, Voc, of about 380 volts. This would result in overcharging the battery and limiting it life. But, if overcharging, or other potentially battery-damaging activity is detected, the battery pack control computer will take appropriate action, up to and including disconnecting the battery from the charger to prevent battery damage. This action is dictated by the algorithm programmed into the battery pack by its designers, so that the PV system described here may be simple, and run open-loop, without possibility of overcharging.

It is preferred that the battery be charged over a period of hours under a relatively small current rather than trying to charge the battery rapidly by application of large currents for short periods of time. A suitable charge rate is a charging rate which will charge a fully-discharged battery to full charge in 5 hours. This charging rate is designated as C/5. The charging current developed by the PV system will vary with solar irradiance. But if the desired C/5 charging rate is to be maintained in all seasons the PV system should at least be capable of developing a C/5 charging rate under the average solar irradiance in January, that is 500 watts/m$^2$.

The utility of this approach may be further appreciated by consideration of the following results of tests in which groups of series-connected Sanyo HIP-190BA3 commercial solar modules each containing 96 solar cells in series as described previously, that were used to charge the 240 to 340 volt NiMH battery discussed above.

The properties of these 96-cell Sanyo HIP-190BA3 modules, based on specifications provided by the manufacturer, are shown in Table 1. The property data are made available under two operating conditions: standard test conditions, STC (1000 W/m$^2$, 25° C., AM1.5 solar spectrum) and typical operating conditions in which the array operating temperature is 52° C.

TABLE 1

| Parameter | Array Value (STC) | Array Value (52° C.) |
|---|---|---|
| Maximum power, P$_{max}$, watts | 190 | 175 |
| Maximum power point voltage, V$_{mpp}$, volts | 54.8 | 50.2 |
| Maximum power point current, I$_{mpp}$, | 3.47 | 3.49 |

TABLE 1-continued

| Parameter | Array Value (STC) | Array Value (52° C.) |
|---|---|---|
| amperes | | |
| Open circuit voltage, $V_{oc}$, volts | 67.5 | 62.0 |
| Short circuit current, $I_{sc}$, amperes | 3.75 | 3.77 |
| Module efficiency, % | 16.1 | 14.8 |
| Temperature coefficient (Pmax), %/° C. | −0.30 | −0.30 |
| Temperature coefficient ($V_{oc}$), V/° C. | −0.169 | −0.169 |
| Temperature coefficient ($I_{sc}$), mA/° C. | 0.86 | 0.86 |

The range of conditions over which a battery was charged in the tests is shown in Table 2. Although the battery was discharged to 240 V, the voltage recovered to the minimum initial values of about 285 volts shown in Table 2 prior to the tests due to "surface" charge effects, a characteristic of this battery.

TABLE 2

| Starting battery voltage, V | 285-289 |
|---|---|
| Ending battery voltage, V | 340 |
| Charge added, Ah | 4.19 |
| Energy added, kWh | 1.38 |

Table 3 lists the charging parameters for a PV system consisting of integral numbers of Sanyo HIP-190BA3 modules wired electrically in series when at module temperature of 52° C. $V_{batt}$ is the cut-off voltage for charging the Panasonic NiMH battery (340 V). Note that the Voc of the 5-module series configuration is less than $V_{batt}$ so that the 5-array module is incapable of fully charging this battery.

TABLE 3

| Number of modules in series | $V_{oc}$ (Volts) | $V_{mpp}$ (Volts) | V90 (L) Volts) | V90 (H) (Volts) | $V_{batt}/V_{mpp}$ | $V_{batt}/V90$ (H) |
|---|---|---|---|---|---|---|
| 5 | 310 | 251 | 208 | 276 | 1.35 | 1.23 |
| 6 | 372 | 301 | 250 | 331 | 1.13 | 1.03 |
| 7 | 439 | 351 | 292 | 386 | 0.97 | 0.88 |
| 8 | 496 | 402 | 333 | 441 | 0.85 | 0.77 |

Figure 7:
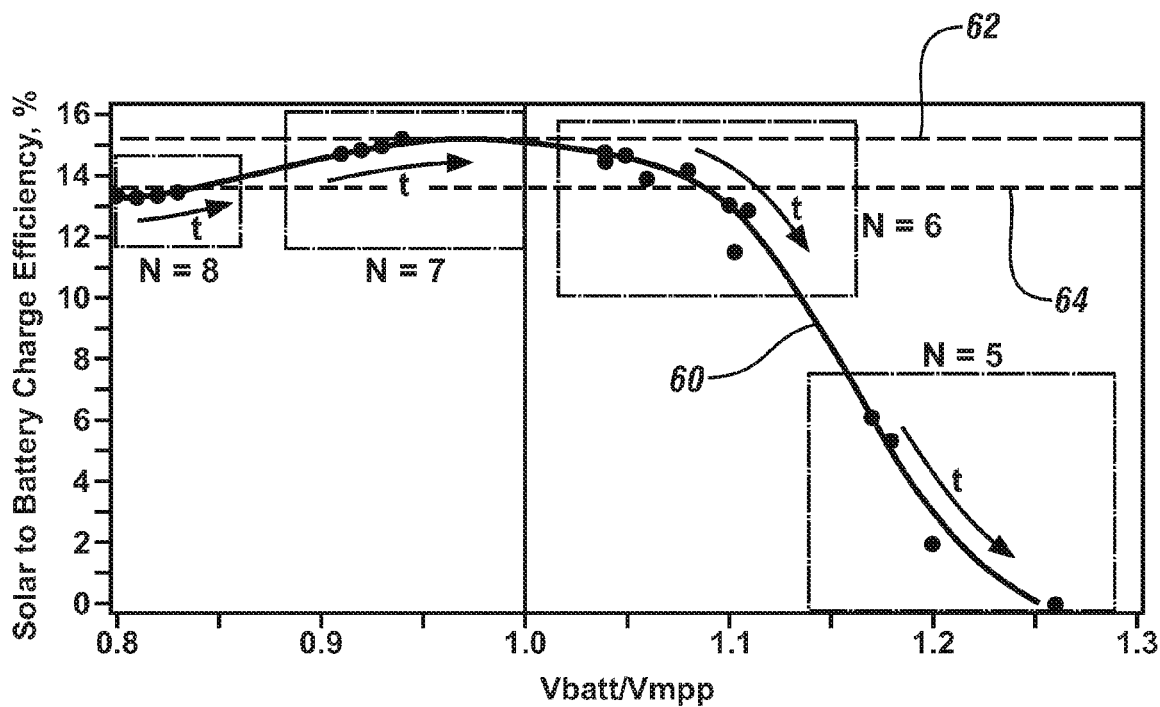
FIG. 7 shows experimental results on the charging efficiency when charging a particular nickel-metal-hydride (NiMH) battery pack, with a full-charge voltage of 340 volts, with a number of PV modules (5, 6, 7 or 8) fabricated by wiring integral numbers of Sanyo HIP-190BA3 solar modules in series.

The results of experiments to measure the battery charging characteristics of the PV systems described in Table 3 are shown in FIG. 7. The results of the battery charging trials have been plotted as the overall solar energy-to-battery charge efficiency versus the ratio of the battery voltage to the maximum power point voltage for each of the modules. The data associated with each module combination are contained in a box and labeled as N=5 etc. corresponding to the number (N) of modules in each array. Within each labeled box are a series of data points which track the efficiency of the process over time, that is, as the battery voltage progressively increases. The time (t) (or, equivalently, voltage) increase direction is indicated by the time (t) arrows within each data box. The complete set of data, from all of the module series combinations, may be fitted (using a spline-fit) to an overall efficiency curve 60. Superimposed on the curve as dashed lines are representations of the maximum (100%) attainable efficiency, line 62, and line 64 representing 90% of that efficiency. Since the solar to electrical efficiency of the solar cells in the modules is fixed, the values represented by lines 62 and 64 will represent the maximum or 100% and 90% solar energy to battery charge coupling efficiency, respectively.

Inspection of the data shows that for the 5-module array the efficiency starts at a low value and decreases as the battery voltage increases. The initial battery voltage, after its recovery to around 285 volts (Table 2), is greater than Vmpp. So, consistent with the results shown in FIGS. 1, 4 and 5, further increases in the operating value of the solar array voltage as the battery charges, progressively decrease the PV/battery system coupling efficiency. In this case the efficiency decreases to zero because Voc for the 5-module array PV system is less than the voltage of the fully-charged battery. In this circumstance the battery sensor and controller capability will not be exercised to avoid overcharging the battery.

The 6-module array has a Vmmp of 301 volts and a V90(H) voltage of 331 volts (Table 3). Thus the initial charging efficiency is high (>90%) but progressively decreases with charging time and as the battery achieves its full charge of 340 volts the charging efficiency falls below 90%. This, of course is consistent with the module V90(H) of 331 volts.

The 7-module array has a Vmmp of 351 volts and a V90(H) voltage of 386 volts (Table 3). Here the battery, over its entire charging range, is substantially operating in the voltage range lying between V90(L) (292 volts) and Vmmp and the efficiency, initially high (>90%) continues to increase, albeit modestly, as charging proceeds.

The 8-module array has a Vmmp of 402 volts and a V90(H) voltage of 441 volts (Table 3). Here the battery, over its entire charging range is substantially operating in the voltage range lying below V90(L) (333 volts) and although the initially low (<90%) efficiency increases with continued charging it only approaches 90% when fully charged.

In each of the 6-, 7-, and 8-module cases, the battery will attain its maximum allowable voltage before the solar array reaches its open circuit voltage. In these three cases charging will be terminated by the battery controller which, responding to the battery voltage, disconnects the battery from the charger when maximum allowable battery voltage (340 V) is attained.

For maximum efficiency then, the terminal battery charging voltage (in this example 340 volts) should substantially equal the solar cell array V90(H) voltage. In this example, because the solar array was fabricated by connecting commercially available modules in series, the properties of the solar array could be changed in only discrete increments of about 50 volts per added module. Even with this limitation it is clear that the module with 7-module array delivered the highest efficiency. However inspection of FIG. 7 suggests that an array with 6.5 Sanyo modules, were such a configuration possible, would perform even better. Assessing the Vmmp and V90(H) values for such a 6.5 module array by interpolating the data for the 6 and 7 module arrays shows that such a 6.5 module array configuration would even better satisfy the charging criterion that the terminal battery voltage should substantially equal to, but not greater than, the V90(H) voltage of the array. Obviously, the number of solar cells and/or modules in the array may be customized for any particular battery and battery characteristics.

An approach employing a permanently-configured PV system is suited to charging a particular battery or battery type. It would also be suited for charging a battery with standardized electrical attributes, analogous to the standard 12 volt battery used in IC-engined vehicles, if such a battery were adopted by all electric vehicle manufacturers. Currently, however every electric vehicle uses a different battery.

In another embodiment the PV system may adapt, by changing cell and module interconnections, to different high-voltage batteries automatically. That is, rather than predetermining the PV system V90(H) voltage for a particular battery, and designing and fabricating a PV system dedicated to that battery, the PV system will be able to accommodate any of a number of batteries within a particular voltage range and automatically switch the number of cells and or modules in series, to appropriately configure a PV system for that particular battery.

Such a PV system, capable of dynamically restructuring itself to efficiently charge traction batteries of different voltages, is suited to accommodate a number of different batteries such as may be employed by different vehicle manufacturers. The possible voltage range spanned by these batteries may be large and could extend, for example, from 200 to 500 volts. As demonstrated by FIG. 4, a single high voltage PV system suited for charging a higher voltage battery, say 400-500 volts will not efficiently charge a lower voltage battery of say 200-300 volts. Similarly a PV system optimized to efficiently charge a 200-300 volt battery will have inadequate voltage capability to charge a 400-500 volt battery.

In this embodiment a customized PV system may be assembled, on demand, from cells and/or modules for any battery currently under charge. The only requirement is that a PV system controller communicate with the battery to determine its fully-charged voltage and direct the assembly of modules and/or cells into an array with a V90(H) voltage substantially equal to the battery charge voltage. The PV system controller may communicate with the battery by means of a sense wire, located, for example on the charge connector which could read information stored in an embedded chip in the battery. But other approaches may be used. These could include, for example, distinctive features on a charging connector, features specific to a particular vehicle or battery, which could be read by a smart charging plug, or through the use of RFID (Radio Frequency Identification) tags or barcodes on the battery or connector, with a reader on the plug. An even simpler approach would use different charging connector geometries for each battery or vehicle, so that selection of a particular charging plug would signal the characteristics of the battery. These and other approaches are well known to those skilled in the art.

Figure 8:
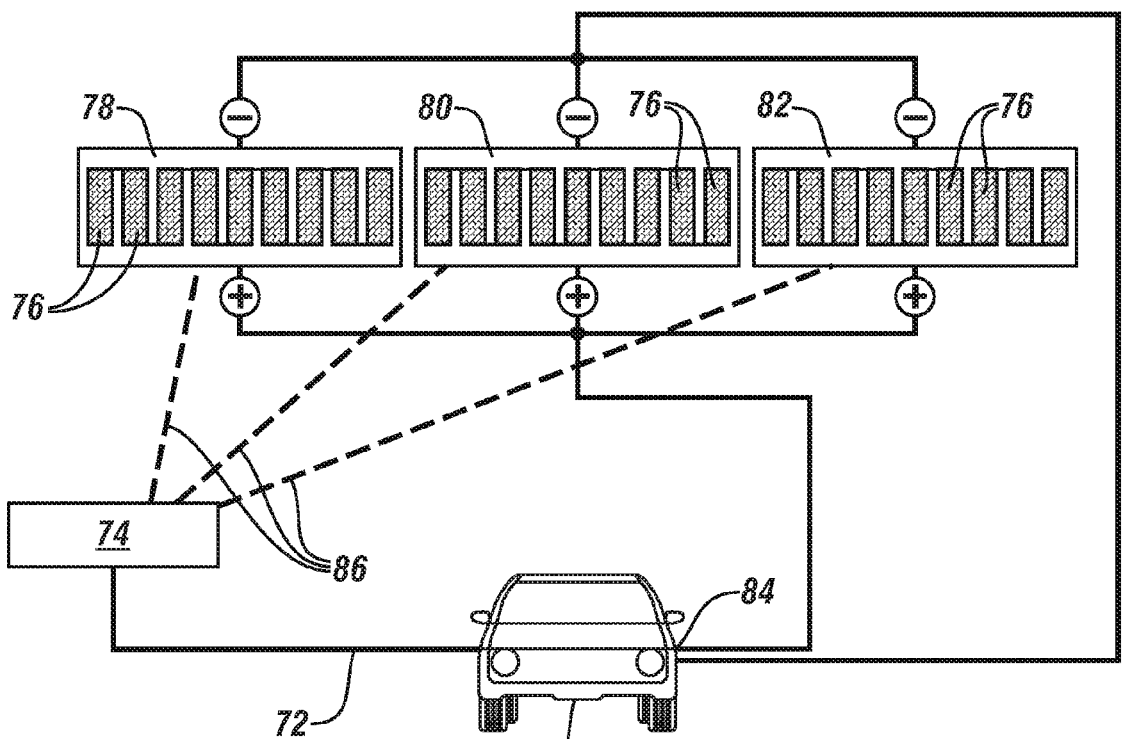
FIG. 8 shows a schematic view of how a series of reconfigurable PV systems, under the control of a PV system controller, might be configured to charge a traction battery in a vehicle.
Figure 9:
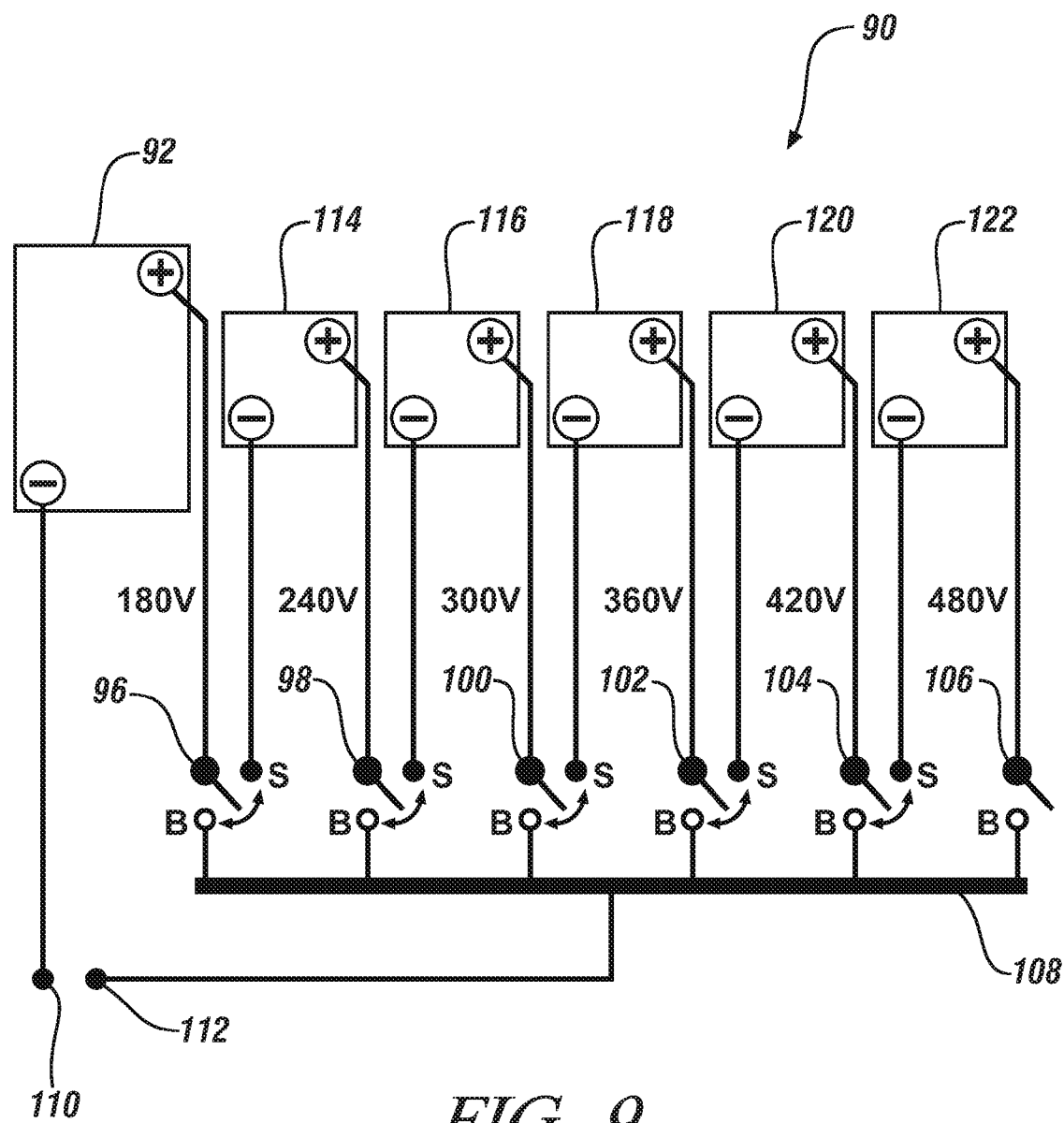
FIG. 9 shows a schematic representation of a reconfigurable PV controller incorporating a number of solar modules.

The approach is illustrated in FIG. 8. Sense wire 72, in communication with PV controller 74, identifies the battery (not shown) in vehicle 70. PV control 74 then directs, through communication paths 86, the assembly of some number, in this depiction 9, solar modules 76 into an array, for example 78, by electrically connecting the modules 76 in series. The number of solar modules (9 are shown) is selected to satisfy, as in the previous embodiment, the requirement that the V90 (H) voltage of the array 78 substantially equal the charged battery voltage. Then an appropriate number of like arrays, a total of 3 in FIG. 8 and identified as 78, 80 and 82, may be assembled by electrically connecting them in parallel to generate a suitable charging current capable of charging the battery at an acceptable charging rate over a suitably short time period. The electrical connection between the PV system and vehicle 70 may through a charging connector 84. An arrangement of solar modules and switches for a reconfigurable PV system is shown in FIG. 9. PV system 90 may be assembled by appropriately connecting some integer number of solar modules in series. In the example of FIG. 9, 60 volt modules have been shown but modules with any convenient voltage capability may be employed. Smaller voltage modules, for example 20 volt modules, will enable more precise matching between the battery charge voltage and the PV system V90 (H) voltage but will require more interconnections and switches. A limiting case, of course, is to use individual solar cells rather than modules. All modules in this example have the same voltage rating, but this is not a requirement. All modules must however use the same cells, or cells with identical current flow at a given voltage, or the lowest current solar cell in the series string will limit the system current.

In FIG. 9, since no voltage of less than 200 volts is anticipated, three 60 volt modules (not shown) are arranged in series as one hard-wired array 92, capable of generating 180 volts. The PV system also includes a string of individual 60 volt modules, 114, 116, 118, 120 and 122 capable of being connected in series with array 92 through switches 96, 98, 100, 102, 104 and 106. Each of switches 96 to 106 has two active positions as well as a neutral position, shown in FIG. 9, in which it makes no connection. In the "S" position the switch will connect its associated array or module in series with the next module in the string. For example switch 96, associated with array 92, when in its "S" position will connect module 114 in series with array 92. Each of switches 96 to 106, when in its "B" position will connect its associated array or module to busbar 108.

By appropriate settings of switches 96 to 106 voltages of 180, 240 300, 360, 420 and 480 volts may be applied to busbar 108 to generate voltages from 180 to 480 volts between charging terminals 110 and 112 for connection to a battery. For example with switches 96 and 98 in their "S" positions, array 92 and modules 114 and 116 will be connected in series. If switch 100 is now set to its "B" position with switches 102, 104 and 106 maintained in their neutral position, a voltage of 300 volts may be established at busbar 108 and between charging terminals 110 and 112. It will be appreciated that switches 96 to 106 may be solid state switches or relays or other devices capable of being operated by the PV system controller.

In the above example, the power generated by modules 118, 120 and 122 was not conveyed to terminals 110 and 112 and is therefore not utilized to charge the vehicle battery. The power available from these modules may be accessed using additional circuitry (not shown) and directed appropriately. For example it might be converted to AC power, using an inverter, and used on-site or fed to the AC grid. Of course it is also possible that no vehicle or battery is connected to the PV system in which case all of the available power may be converted to AC and re-directed.

Figure 10:
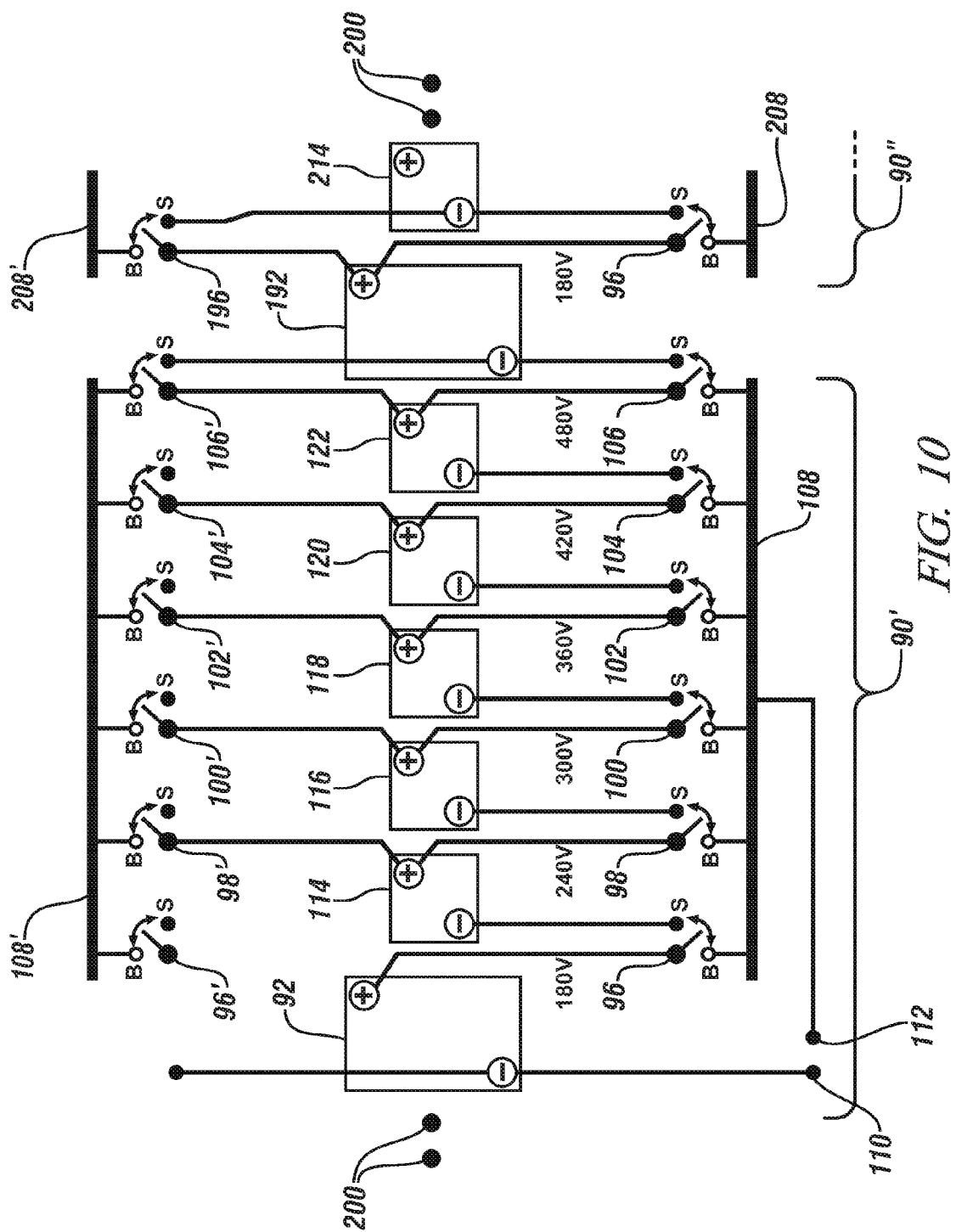
FIG. 10 shows a partial, schematic representation of a string of reconfigurable PV controllers, adapted from the PV controller of FIG. 9, intended for charging of several batteries, possibly with different charged voltages, simultaneously.

A portion of a yet more flexible traction battery charging arrangement is shown in FIG. 10. In this embodiment a string of reconfigurable PV systems similar to that shown in FIG. 9 is employed. A fragment of this string is shown in FIG. 10 as a first complete reconfigurable PV system 90' and a second reconfigurable PV system 90" shown only in part. Additional reconfigurable PV systems represented by large dots 200 may be added to either or both of systems 90' and 90" to form a more extended string.

Reconfigurable PV system 90' of FIG. 10 has all the features and capabilities of system 90 in FIG. 9 but has added a second busbar 108' and a second set of switches 96' to 106' individually connected, through unlabelled terminals on each of array 92 and modules 114 to 122. Like their counterparts 96 to 106, each of switches 96' to 106' has two active positions and a neutral position. As in FIG. 9, the active positions are: an "S" position to connect its associated array or module in series with the next module in the string; and a "B" position to connect its associated array or module to busbar 108'.

Figure 11:
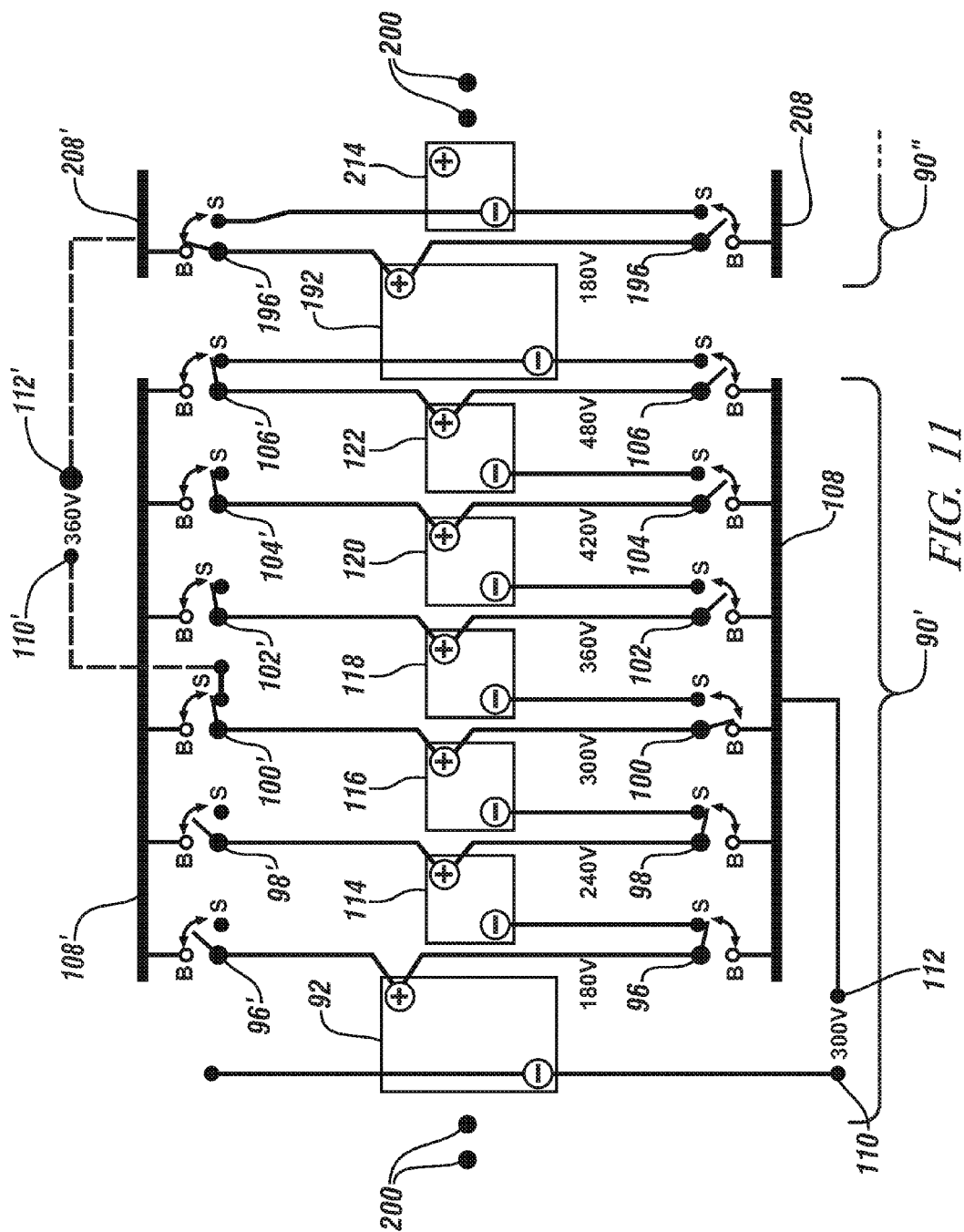
FIG. 11 shows the partial schematic representation of a string of reconfigurable PV controllers of FIG. 10 configured to simultaneously deliver charging voltages of 300 volts through one set of charging connectors and 360 volts through a second through a second set of charging connectors.

With the addition of second busbar and array and module connections, the arrays and modules in the string may be combined to construct a charging system for a wide range of batteries of varying voltage as shown in the exemplary configuration of FIG. 11.

In FIG. 11, switches 96 and 98 are in their "S" position and switch 100 is in its "B" position, with switches 102, 104 and 106 in the neutral position. These switch settings connect the modules 114 and 116 in series with array 92 and connect this series-connected group with busbar 208 to establish a voltage of 300 volts between charging terminals 110 and 112. By placing switches 102', 104' and 106' in their "S" positions and switch 196' of reconfigurable PV system 90" in its "B" position, modules 118, 120 and 122 and array 192 of reconfigurable PV system 90" will be series-connected. This will result in busbar 208' being at a voltage of 360 volts relative to the negative connector 130 of module 118. By appropriate connection to switch terminal 130' of switch 100' the 360 volt voltage may be established at second pair of charging connector terminals 110' and 112'.

It will be appreciated that switches 96-106, 196', and 96'-106' may be solid state switches or relays or other devices capable of being operated by the PV system controller. Similar practices may be followed with other, unused modules in PV system 90", for example module 214, and other reconfigurable PV systems 200 in the string. As more PV systems and modules are engaged, additional busbars and switches may be added if required, to enable charging of any number of batteries of any voltage within the operating range of the arrays.

The voltage of a solar module is usually cited as its open circuit voltage with its V90(H) voltage being about 88% of Voc or about 53 volts for a 60 volt Voc module. So the reconfigurable PV array of FIG. 9 is suited to charge traction batteries with charged voltages ranging from about 210 to about 425 volts. This voltage range may be extended, up to the breakdown voltage of the modules, by adding additional modules to the system.

As described previously, a convenient charging rate is C/5, corresponding to a charging current of $\frac{1}{5}^{th}$ of the current necessary to fully charge an initially discharged battery in one hour. If the reconfigurable PV system of FIG. 9 is incapable of satisfying a C/5 charging rate additional reconfigurable PV systems may be connected in parallel with a first system as illustrated in FIG. 8.

With the configuration of FIG. 10, as demonstrated by the specific configuration shown in FIG. 11, more of the available solar energy may be employed in charging batteries. But in this configuration, like that of FIG. 9 there may also be some portion of the solar energy excess to the battery charging needs. Again, this may be converted to AC power and directed appropriately.

While preferred embodiments of the invention have been described as illustrations, these illustrations are not intended to limit the scope of the invention.

The invention claimed is:

1. A standalone photovoltaic system, external to any vehicle, for charging a rechargeable battery for powering a traction motor in a vehicle, the battery producing a specified charged voltage ranging from 200 to 500 volts and a specified discharged voltage, the photovoltaic system being connectable to a battery requiring charging and comprising:
   a plurality of electrically connected solar modules so connected and arranged that the photovoltaic system;
   has an open circuit voltage which is greater than the known charged voltage of the battery requiring charging when the photovoltaic system is exposed to a solar irradiance of at least 100 watts per square meter;
   has a maximum power point voltage at which the system produces its maximum power and a V90(H) voltage, greater than the maximum power point voltage, at which the system produces 90% of its maximum power and the V90(H) voltage of the photovoltaic system is substantially equal to the known charged voltage of the battery requiring charging so that the photovoltaic system may be directly connected to the battery; and
   is capable of increasing the voltage of the battery from its discharged voltage to its charged voltage in less than five hours when exposed to a solar irradiance of at least 260 watts/m$^2$.

2. The photovoltaic system for charging a rechargeable battery for powering a traction motor in a vehicle as recited in claim 1 in which the electricity produced by the photovoltaic system is transferred to the battery with an overall efficiency of about 90% during charging.

3. The photovoltaic system for charging a rechargeable battery for powering a traction motor in a vehicle as recited in claim 1 in which the solar cells are silicon-based.

4. The photovoltaic system for charging a rechargeable battery for powering a traction motor in a vehicle as recited in claim 1 in which the solar cells comprise compound semiconductors.

5. The photovoltaic system for charging a rechargeable battery for powering a traction motor in a vehicle as recited in claim 1 further comprising a sensor for sensing the specified charge voltage of a battery and a photovoltaic system controller to vary the connections between the solar modules to enable the photovoltaic system to charge any battery whose specified charge voltage lies in the range of 200 to 500 volts.

6. The photovoltaic system for charging a rechargeable battery for powering a traction motor in a vehicle as recited in claim 5 in which the connections between the solar modules are variable to enable the photovoltaic system to charge a plurality of separate and independently-connected batteries simultaneously.

7. The photovoltaic system for charging a rechargeable battery for powering a traction motor in a vehicle as recited in claim 6 in which the plurality of separate and independently-connected batteries has different charged voltages.

8. A method for charging a rechargeable battery for powering a traction motor in a vehicle using a photovoltaic system external to the vehicle and connectable to the battery requiring charging, the photovoltaic system being assembled from at least a portion of a photovoltaic array comprising photovoltaic cells and/or modules and an array controller, the battery producing a specified discharged voltage and a specified charged voltage of between 200 volts and 500 volts, the battery and/or vehicle comprising at least a sensor for measuring battery voltage and a battery controller for disconnecting the battery from the photovoltaic system when the battery voltage is substantially equal to the charged voltage, the method comprising:
   directly connecting the photovoltaic array to the battery;
   sensing the specified charged voltage of the battery using the array controller;
   assembling, under the direction of the array controller, a photovoltaic system suitable for charging the battery by electrically connecting together a plurality of photovoltaic cells and/or modules, arranged and adapted to produce electricity at an open circuit voltage which is greater than the charged voltage of the battery when under a solar irradiance of at least 100 watts per square meter; the photovoltaic system having a maximum power point voltage at which the system produces its maximum power and a V90(H) voltage, greater than the maximum power point voltage at which the system produces 90% of its maximum power, the V90(H) voltage of the PV system being substantially equal to the charged voltage of the battery; the PV system having a short circuit current adapted to charge the battery in a predetermined time;
   providing the power generated by the photovoltaic system to the battery; then, when the battery sensor senses that the battery has substantially reached its charge voltage, having the battery controller disconnect the photovoltaic system from the battery.

9. The method for charging a rechargeable high voltage traction battery for a vehicle as recited in claim 8 in which the predetermined charging rate is C/5 under a solar irradiance of 260 watts/m$^2$.

10. The method for charging a rechargeable high voltage traction battery as recited in claim 8 in which the solar cells, modules or arrays are silicon-based.

11. The method for charging a rechargeable high voltage traction battery as recited in claim 8 in which the solar cells, modules or arrays comprise compound semiconductors.

12. A method for charging one or more rechargeable high voltage traction batteries for vehicles using a like number of photovoltaic systems assembled from an external photovoltaic array and connectable to the batteries requiring charging, the array comprising photovoltaic cells and/or modules and an array controller, each of the batteries requiring charging producing a specified discharged voltage and a specified charged voltage of between 200 and 500 volts, each battery and/or vehicle comprising at least a sensor for battery voltage and a battery controller for disconnecting the battery from the charging system when the battery voltage is substantially equal to the charged voltage, the method comprising:
   directly connecting the photovoltaic array to each battery;
   sensing the specified charged voltage of each of the batteries using the array controller;
   assembling, under the direction of the array controller, one or more individual photovoltaic (PV) systems, one for each battery to be charged, by electrically connecting together, in series and/or parallel, a plurality of photovoltaic cells and/or modules; the electrical characteristics of each of the PV systems being associated with a particular battery and the PV system adapted to produce electricity at an open circuit voltage which is greater than the charged voltage of the battery with which it is associated when under a solar irradiance of at least 100 watts per square meter; the PV system for each battery having a maximum power point voltage at which the system produces its maximum power and a V90(H) voltage, greater than the maximum power point voltage at which the system produces 90% of its maximum power, the V90(H) voltage of the PV system associated with each battery being substantially equal to the charged voltage of its associated battery; the PV system associated with each battery having a short circuit current adapted to charge the battery in a predetermined time;
   providing the power generated by the photovoltaic system to the battery; then,
   when the battery has substantially reached its charge voltage having the battery controller disconnect the array from the battery.

13. The method for charging one or more rechargeable traction batteries for vehicles as recited in claim 12 in which the current developed by each of the PV systems enables a charging rate of C/5 for its selected battery.

14. The method for charging one or more rechargeable traction batteries for vehicles as recited in claim 12 in which the solar cells, modules or arrays comprise silicon.

15. The method for charging one or more rechargeable traction batteries for vehicles as recited in claim 12 in which the solar cells, modules or arrays comprise compound semiconductors.

* * * * *